United States Patent [19]

McIlwraith et al.

[11] Patent Number: 5,367,360
[45] Date of Patent: Nov. 22, 1994

[54] AUTOMATIC LOADER FOR UNEXPOSED PRINTING PLATES

[75] Inventors: Lon W. McIlwraith, Delta; Timothy J. Henthorne, Vancouver, both of Canada

[73] Assignee: Creo Products Inc., Burnaby, Canada

[21] Appl. No.: 140,922

[22] Filed: Oct. 25, 1993

[51] Int. Cl.⁵ .............................. G03B 27/04
[52] U.S. Cl. ....................... 355/85; 271/11; 271/94; 355/89
[58] Field of Search ............... 271/11, 93, 94; 355/72, 355/73, 85, 89, 91, 99

[56] References Cited

U.S. PATENT DOCUMENTS

| | | | |
|---|---|---|---|
| 4,212,263 | 7/1980 | Hillhouse | 118/37 |
| 4,402,592 | 9/1983 | Schön et al. | 355/73 X |
| 4,931,833 | 6/1990 | Elwing | 355/85 |
| 5,055,875 | 10/1991 | Fischer et al. | 355/89 |
| 5,084,728 | 1/1992 | Horikiri et al. | 355/72 |
| 5,165,062 | 11/1992 | Ogura et al. | 355/85 X |
| 5,322,268 | 6/1994 | Okutsu et al. | 271/11 |

Primary Examiner—Richard A. Wintercorn

[57] ABSTRACT

An automatic loader loads multiple sizes of unexposed printing plates into an exposure unit without using cassettes. The cardboard shipping container is used as a cassette by removing the front wall. Plates are lifted and loaded by a vacuum system. Paper used to separate plates in shipping container is removed by two sets of motorized rollers. The top rollers slide the paper off the plate while the bottom rollers completely remove the separating paper from the shipping box in order to avoid jamming and allow the shipping box to be reclosed. Shipping container is used with the active side of the plates facing down in order to protect plates from accidental exposure.

5 Claims, 2 Drawing Sheets

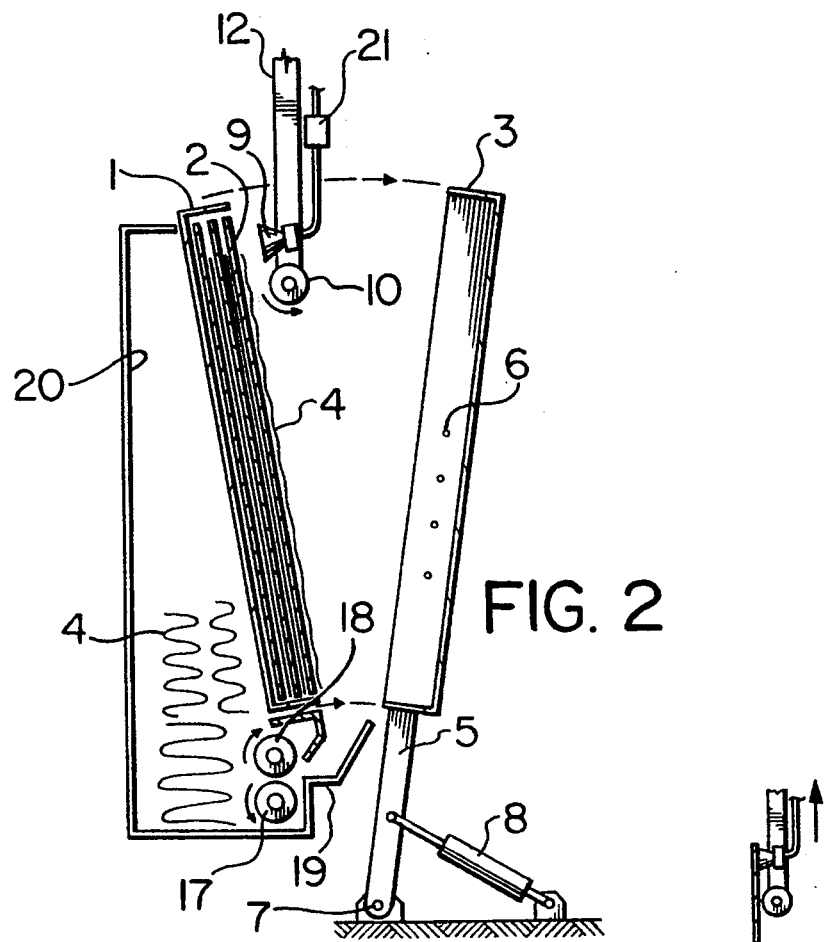
FIG. 2
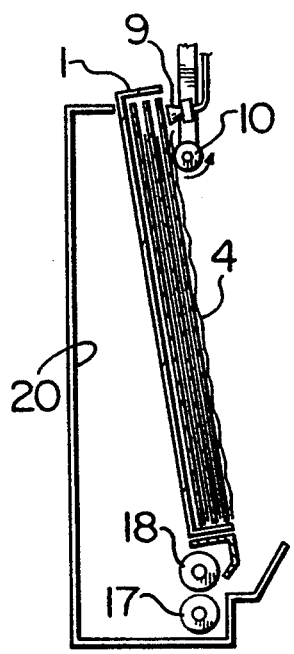
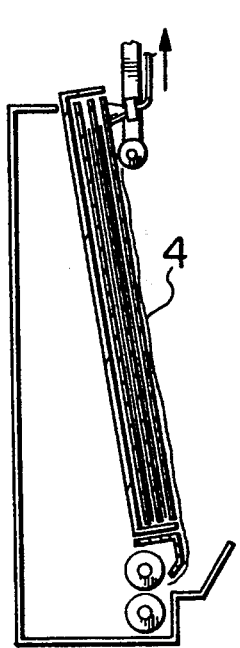
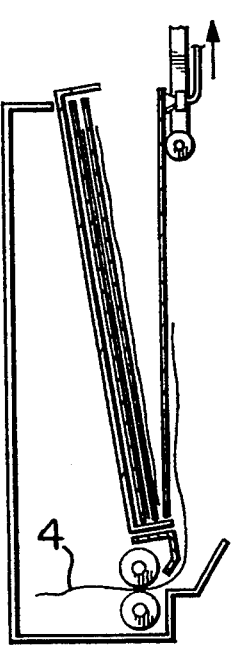
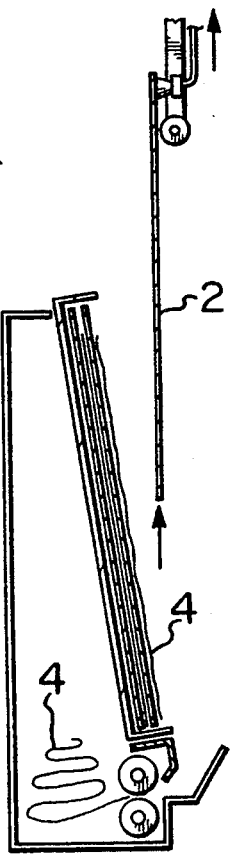
FIG. 3a　　FIG. 3b　　FIG. 3c　　FIG. 3d

AUTOMATIC LOADER FOR UNEXPOSED PRINTING PLATES

This invention relates to the exposure of offset printing plates and more specifically to a device for automatically loading unexposed plates into an exposure unit. Prior art automatic loaders use cassettes of different sizes to accommodate the unexposed plates. The cassette facilitates loading and protects the unexposed plates from stray light when cassette is inserted into exposure unit. An example of using cassettes to handle plates is given in U.S. Pat. No. 5,055,875.

The need to have many different cassettes for the different plate sizes and the added cost of loading the plates into the cassette under proper lighting conditions is a significant limitation of the prior art. Prior art of eliminating cassettes by using shipping container as a cassette, such as U.S. Pat. No. 5,084,728 are limited to materials which are packed without a separating layer of paper which needs removal from each item in the cassette. Failure to completely remove the separating paper layer could cause jamming of the automatic loader mechanism. Prior art methods of removing the separating layer between printing plates are limited to air jets, such as shown in U.S. Pat. No. 4,402,592. In this patent, as in the current invention, plates are lifted from the back side using suction cups and an air jet is used to separate the paper from the plate. This method was found to be unreliable since the paper sometimes adheres to the edges of the plates as a consequence of shearing the plates (and paper) to size. The present invention discloses a reliable method of separating the paper from the plates, by using two sets of motorized rollers: a top set forcing the paper to separate from the plate and a bottom set gripping the falling paper and pulling it out of the box. Since both sets of rollers are motorized their action is positive and reliable. As the paper is completely removed from the shipping container, the container can be re-closed and removed without risk of exposing the remaining plates.

It is the most important object of the present invention to eliminate the use of cassettes altogether and use the shipping container as a cassette, without having to remove the paper separating the plates. It is another object to eliminate the labour associated with loading plates from the shipping container into cassettes. A further objective is to minimize potential damage to the active side of the plate caused by the above mentioned handling.

Other objects, including certain novel details of construction, will become apparent while studying the following specifications in conjunction with the accompanying drawings wherein:

FIG. 2 is a cross-section of the invention.

FIG. 3 is a cross-section of the invention showing the sequence of paper removal.

DETAILED DESCRIPTION OF THE INVENTION

Figure 1:
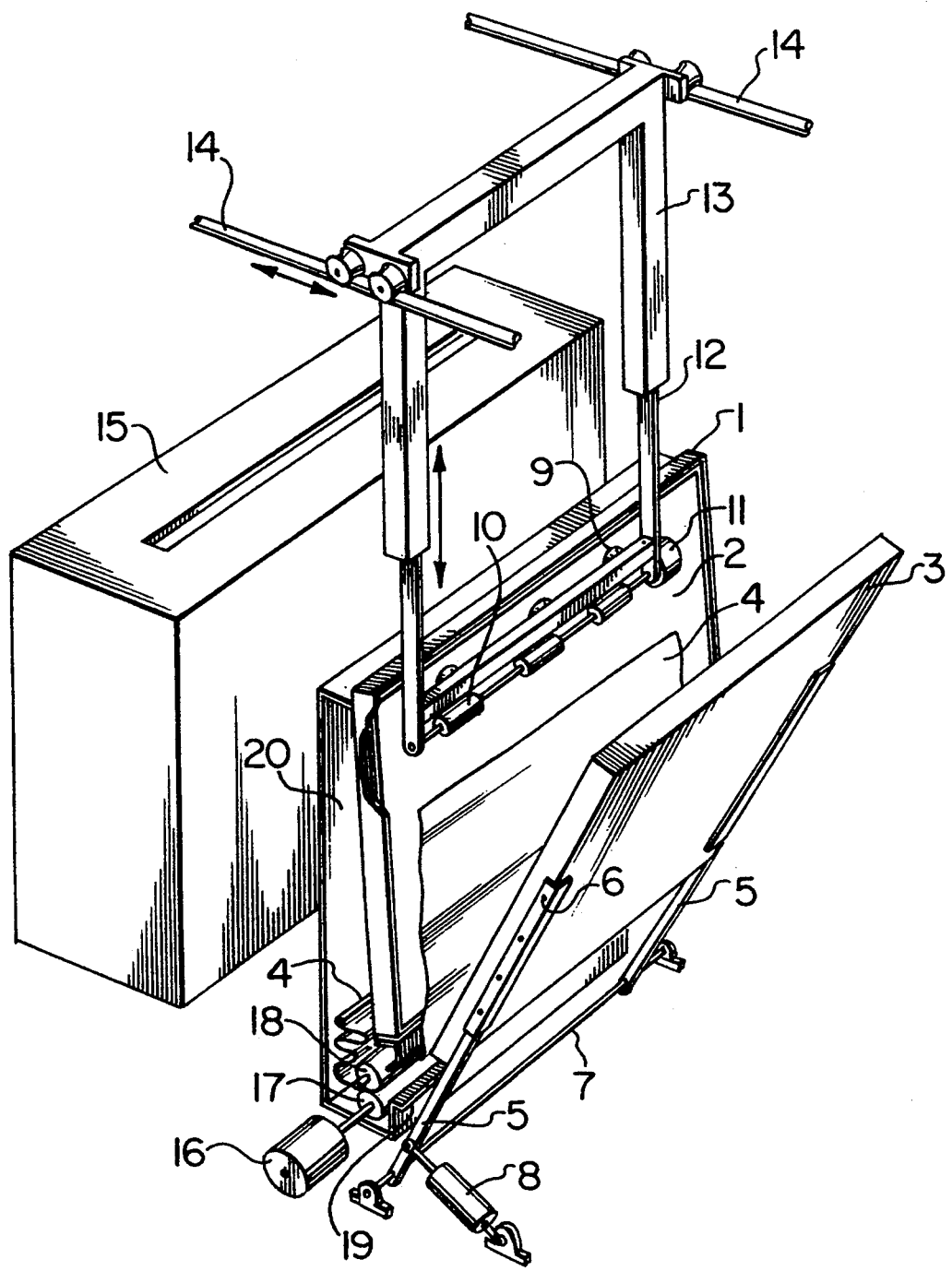
FIG. 1 is a perspective view of the invention.

Referring to FIG. 1 and FIG. 2, a box used to ship printing plates 1 (usually made of corrugated cardboard) contains unexposed printing plates 2 separated by thin paper sheets ("slip sheets") 4. The box is normally closed with cover 3, shown open in FIG. 1 and FIG. 2. Cover 3 is held open by arms 5 pivoting on shaft 7 and holding the cover with short sharp spikes 6. Before cover 3 is opened, sharp spikes 6 are pushed into cover 3. The spikes are short in order not to penetrate beyond the wall thickness of cover 3. Air cylinder 8 is used to open and re-close box 1. Box may require re-closing if it has to be removed from machine before all plates are used up. After box is re-closed bars containing spikes 6 are pulled off and box can be removed. The invention shown in FIG. 1 can remove printing plates 2 from the shipping box, separate the plates from paper sheets 4 and load the plates into an exposure device 15. No details about the exposure device are given since it does not form part of the invention.

The main problem in handling plates directly from the shipping box is the reliable separation of the paper sheets. The plates are lifted vertically by a frame 11 sliding into a guide 13 and moved horizontally by guide 13 moving on track 14. The details of the vertical and horizontal movements are not discussed as they are common and not critical. Frame 12 is equipped with suction cups 9, gripping the plate when vacuum is activated by a vacuum valve 21 in FIG. 2. This is a common way of handling metal sheets and requires no further explanation. By the way of example cups, 9 are about 50 mm in diameter and made of rubber. Frame 12 also contains an elastomeric roller 10 driven by electric motor 11. As frame 11 is moved towards the plate 2 the high friction of roller 10 against the back of plate 2 will pull down any paper adhering to the plate and clear the area above the roller for the suction cups 9 to come to contact with the plate. Both suction cups 9 and rollers 10 are mounted to frame 11 with some freedom to swivel and align themselves to the plate. It is an advantage to package the plates in box 1 having the light sensitive side of the plates facing down, thus any accidental light leakage will only reach the back side of the plate. Since most plates are made of aluminum, no light will reach the front side. The paper sheet 4, once positively separated from plate 2 by action of rollers 10 will slide to the bottom of the box and be directed by deflector sheet 19 into a pair of pinch rollers, 17 and 18. These rollers are driven by electric motor 16. By the way of example, rollers 10, 17 and 18 are made out of polyurethane and have a diameter of about 50 mm. They are rotated at about 100 RPM. The paper is pulled by the rollers into compartment 20. Driven pinch rollers 17 and 18 are sufficiently powerful to overcome any jammed paper, since the paper can come off the plates in many different ways. Since no paper is left piled up in box 1, it can be re-closed without risk of exposing unused plates.

The sequence of operations in picking up a plate is shown in FIG. 3-a to FIG. 3-d. Referring now to FIG. 3-a, a paper sheet 4 is shown still attached to the back of a plate. Normally paper 4 will slide down but it can stay attached to the plate. When paper stays attached to plate it has to be moved away from area contacted by vacuum cups 9. This is done by motorized elastomeric roller 10. In FIG. 3-b, the vacuum is applied to grip the plate. In FIG. 3-c the plate is moved away from the box. At the same time the paper sheet is gripped by pinch rollers 17, 18 and moved into compartment 20. In FIG. 3-d, the plate is lifted out of the box.

It is obvious that more motorized roller, similar in construction to roller 10 can be added on the other side of the plate for even greater protection against paper sheets which stay attached to the front of the plate. It is also obvious that passive devices, such as brushes or flaps, can be added for further assurance that the paper did not stay attached to the plate when the plate is lifted out of the box. The essence of the invention is to use the positive action of motorized rollers to separate the paper from the plate and to move the paper to a separate compartment.

What is claimed is:

1. An automatic loader for printing plates capable of picking up plates directly out of their shipping container, comprising:

a plurality of light sensitive unexposed printing plates packed in a re-closable closeable shipping container, said plates having the light sensitive side facing down and the back of the plate facing the cover or said container and having a thin sheet of separator material between every two plates;

means of opening and closing said container;

a plurality of suction cups for picking up said plates from their back side;

a motorized elastomeric roller applied to the back side of said plates in order to remove said separator material from the area said suction cup need to contact said plates;

a pair of motorized pinch rollers located at the bottom of said automatic loader and rotating in a direction pulling any separator material caught by the rollers out of said shipping container in order to prevent any accumulation of separator material in the shipping container.

2. An automatic loader as claimed in claim 1 wherein said shipping container is disposable.

3. An automatic loader as claimed in claim 1 wherein said shipping container is reusable.

4. An automatic loader as claimed in claim 1 wherein said shipping container is made of corrugated cardboard.

5. An automatic loader as claimed in claim 1 wherein said separator material is made of thin paper.

* * * * *